(12) United States Patent
Harris et al.

(10) Patent No.: US 8,741,987 B2
(45) Date of Patent: Jun. 3, 2014

(54) POLYMER SILICA-REINFORCED MASTERBATCH WITH NANOMATERIAL

(75) Inventors: Lawrence Douglas Harris, Baton Rouge, LA (US); Mark Arigo, Baton Rouge, LA (US); Subir Debnath, Baton Rouge, LA (US); Jorge Soto, Baton Rouge, LA (US)

(73) Assignee: Lion Copolymer Holdings, LLC, Geismar, LA (US)

( * ) Notice: Subject to any disclaimer, the term of this patent is extended or adjusted under 35 U.S.C. 154(b) by 43 days.

(21) Appl. No.: 13/594,636

(22) Filed: Aug. 24, 2012

(65) Prior Publication Data

US 2013/0203917 A1 Aug. 8, 2013

Related U.S. Application Data

(60) Provisional application No. 61/594,259, filed on Feb. 2, 2012.

(51) Int. Cl.
*C08J 3/20* (2006.01)

(52) U.S. Cl.
USPC ............ 523/351; 524/262; 524/263; 524/267; 524/269; 524/492; 524/493; 524/495; 524/496

(58) Field of Classification Search
USPC .......... 523/351; 524/262, 263, 267, 269, 492, 524/493, 495, 496
See application file for complete search history.

(56) References Cited

U.S. PATENT DOCUMENTS

| | | | |
|---|---|---|---|
| 2,384,543 A | 9/1945 | Fryling | |
| 3,055,956 A | 9/1962 | Paulsen | |
| 3,317,458 A | 5/1967 | Willi Clas et al. | |
| 3,686,113 A | 8/1972 | Burke, Jr. | |
| 3,767,605 A | 10/1973 | Gerlicher | |
| 3,907,734 A | 9/1975 | Broeck et al. | |
| 4,076,769 A | 2/1978 | Watts | |
| 4,104,323 A | 8/1978 | Hansen | |
| 4,213,888 A | 7/1980 | Karg et al. | |
| 4,481,329 A | 11/1984 | Ambler et al. | |
| 4,482,657 A | 11/1984 | Fischer et al. | |
| 5,093,407 A | 3/1992 | Komai et al. | |
| 5,304,591 A | 4/1994 | Nowakowsky et al. | |
| 5,405,897 A | 4/1995 | Segatta et al. | |
| 5,504,168 A | 4/1996 | Maestri et al. | |
| 5,763,388 A | 6/1998 | Lightsey et al. | |
| 5,985,953 A | 11/1999 | Lightsey et al. | |
| 6,197,384 B1 | 3/2001 | Schubert et al. | |
| 6,346,579 B1 | 2/2002 | Zanzig et al. | |
| 6,403,693 B2 | 6/2002 | Materne et al. | |
| 6,579,929 B1 | 6/2003 | Cole et al. | |
| 6,635,700 B2 | 10/2003 | Cruse et al. | |
| 6,921,785 B2 | 7/2005 | Campbell et al. | |
| 7,335,807 B2 | 2/2008 | Hochgesang | |
| 7,585,914 B2 | 9/2009 | Tsou et al. | |
| 7,723,415 B2 | 5/2010 | Lichtenhan et al. | |
| 2004/0071626 A1 | 4/2004 | Smith et al. | |
| 2005/0256267 A1 | 11/2005 | Hochgesang | |
| 2006/0100320 A1 | 5/2006 | Dalphond et al. | |
| 2007/0106024 A1 | 5/2007 | Tsou et al. | |
| 2007/0260005 A1 | 11/2007 | Karato et al. | |
| 2008/0221274 A1 | 9/2008 | Jourdain | |
| 2008/0293889 A1 | 11/2008 | Obrecht | |
| 2009/0099309 A1 | 4/2009 | Gumbs | |
| 2009/0124730 A1 | 5/2009 | Matsuda et al. | |
| 2009/0137716 A1 | 5/2009 | Furukawa et al. | |
| 2010/0022684 A1 | 1/2010 | Wallen et al. | |
| 2010/0179249 A1 | 7/2010 | Schomaker et al. | |
| 2011/0165356 A1 | 7/2011 | Harris et al. | |
| 2011/0166262 A1 | 7/2011 | Harris et al. | |
| 2011/0166263 A1 | 7/2011 | Rikhoff et al. | |
| 2011/0166265 A1 | 7/2011 | Harris et al. | |

FOREIGN PATENT DOCUMENTS

| | | |
|---|---|---|
| CA | 1242832 | 10/1988 |
| CA | 2724798 | 1/2010 |
| DE | 1188797 | 3/1965 |
| JP | 2005-33019 | 12/2005 |

*Primary Examiner* — Edward Cain
(74) *Attorney, Agent, or Firm* — Buskop Law Group, PC; Wendy Buskop

(57) ABSTRACT

A polymer masterbatch in latex form having nanomaterials and a compatibilized silica for incorporation into natural and synthetic polymers in latex form using precipitated or fumed silica with at least two organosilicon coupling compounds attached to the silica in an aqueous suspension.

11 Claims, No Drawings

US 8,741,987 B2

POLYMER SILICA-REINFORCED MASTERBATCH WITH NANOMATERIAL

CROSS REFERENCE TO RELATED APPLICATIONS

The present application claims priority to and the benefit of U.S. Provisional Patent Application Ser. No. 61/594,259 filed on Feb. 2, 2012, entitled "FUNCTIONALIZED SILICA FOR RUBBER MASTERBATCH." This reference is hereby incorporated in its entirety.

FIELD

The present embodiments generally relate to compatibilized silica with a plurality of silanes for incorporation into natural and synthetic polymers in latex form or dry blending operations.

BACKGROUND

Silica and carbon black have been commonly used as reinforcing agents and/or fillers in rubber and thermoplastic polymers. A number of techniques have been developed to incorporate such reinforcing agents and fillers into the polymer compositions, including both wet and dry blending processes. The incorporation of such silica and carbon black as reinforcing agents and/or fillers is far more complex than might otherwise appear. One problem in wet blending of silica with lattices of such polymers arises from the fact that the hydrophilic silica has a tendency to associate with the aqueous phase and not blend uniformly with the hydrophobic polymer and the fillers.

Perhaps the most commonly employed practice, used commercially, is the technique of dry blending either silica, carbon black or both of them into rubber and thermoplastic polymers in a high-shear milling operation. That practice has many limitations. Notable among them include the tendency of the filler particles to agglomerate to each other, resulting in non-uniform dispersion of the filler throughout the polymer constituting the continuous phase.

Another problem commonly experienced in such high-shear milling operations is the tendency of the polymers to degrade during milling. Milling necessitates the use of higher molecular weight polymers, which sometimes require the incorporation of various types of processing aids to facilitate mixing and dispersion of the filler particles into the polymer constituting the continuous phase. The cost associated with the use of such processing aids also increases the manufacturing cost of the polymeric compound or article. The use of processing aids has the further disadvantage in that such processing aids may have a negative effect on the cure or end use of the polymer. And, in addition, dry blending techniques add additional processing costs, in part due to the accompanied excessive equipment wear by the abrasive fillers.

There is a need to provide a simple and less expensive technique for the uniform incorporation of silica with other fillers into natural and synthetic polymer latexes which do not require the use of complex processing aids.

There is also need to provide a process for the incorporation of silica which reduces sulfur content in the resultant rubber, into natural and synthetic polymers at the latex stage which is simple and inexpensive.

Another need is to provide a process for the incorporation of silica reinforcing agent into natural and synthetic polymers in which the silica can be substantially uniformly dispersed and the nanomaterial can be uniformly dispersed while forming a stable polymer matrix during processing for end use. Nanomaterial is small particulate material with each particulate having a diameter ranging only from 10 to 50 microns.

A need exists for a silica, compatible with natural and synthetic polymers, having two different organic coatings chemically bonded on the silica surface.

The present embodiments meet these needs.

BRIEF DESCRIPTION OF THE DRAWINGS

N/A

DETAILED DESCRIPTION OF THE EMBODIMENTS

Before explaining the present process in detail, it is to be understood that the process is not limited to the particular embodiments and that it can be practiced or carried out in various ways.

The present embodiments generally relate to compatibilized silica with a plurality of silanes for incorporation into natural and synthetic polymers in latex form or dry blending operations.

The present embodiments further relate to compatibilized silica formed by the reaction of precipitated or fumed silica with a plurality of organosilicon coupling compounds in aqueous suspension. Polymer-silica reinforced masterbatches are prepared by addition of the compatibilized silica slurry with nanomaterial to natural and synthetic polymer lattices.

The present embodiments relate to an improved process for the manufacture of silica-filled masterbatches with nanomaterial of natural and synthetic rubber and thermoplastic polymers, particularly to those polymers prepared by emulsion polymerization processes.

The further relate to an improved process for the uniform incorporation of a compatibilized silica slurry into such polymers with additional nanomaterial at the latex stage.

The silica can be treated with two different coupling agents forming a compatibilized silica slurry.

The compatibilized silica slurry can then be blended with the natural or synthetic polymer in a latex form, allowing the silica to substantially uniformly distribute through the polymer latex and provide improved loading of nanomaterial.

The improved filling of nanomaterial reduces cost of the rubber without altering the physical state of the polymer particles in such latex, thus permitting the incorporation into the latex of other processing chemicals, such as antistatic material, extender oils and antioxidants.

The silica can be incorporated into and adheres to the polymer after coagulating the latex.

The process can be used with any natural or synthetic polymer made into latex form.

The process can be used for natural and synthetic rubber lattices and for incorporation into a continuous or batch emulsion polymerization process at the latex stage.

An anticipated benefit of this invention is improved rolling resistance with an improvement of about 15 percent to 17 percent improved rolling resistance, as measured by tangent delta at 60 degrees Celsius for the final rubber formulation.

A benefit of this invention is that tensile strength of a final rubber formulation is expected to exhibit improved characteristics for use in warm weather when at least two silane coupling agents are used simultaneously on the silica and then the nanomaterial is added to the latex.

Still another benefit of this invention is that the final formulation will exhibit improved elongation of the resultant polymeric rubber with the use of the two silanes over use with one silane on the silica by about 10 percent and then further improved elongation when the nanomaterial is added to the formulation.

By using at least two coupling agents simultaneously, and then adding the nanomaterial, the resultant rubber formulation for use in tires, is expected to be more resilient, due to both (i) a reduction in sulfur in the overall rubber formulation which enhances life of tires made with the rubber, and (ii) production of two different structural properties, such as reduced degradation at elevated temperatures based on the use of the two silanes and (iii) improved wear, due to the rigidity of the nanomaterial and (iv) reduced cost for manufacture.

Still another benefit of the invention is the production of a unique dual silane silica masterbatch with nanomaterial is that the resultant rubber will have reduced scorch. It is expected that the scorch of the final rubber formulation will be reduced by at least 2 percent and as much as 4 percent with this formulation.

Another benefit of the formulation is the rubber is expected to be stronger by 10 percent than without the nanomaterials.

The term "compatibilized silica slurry" can refer to an aqueous suspension of silica with some of its reactive sites rendered hydrophobic via a reaction with at least two coupling agents, the hydrophobic portion of each of the at least two coupling agents being compatible with the natural or synthetic polymer to which the silica is blended.

The term "coupling agent" can refer to a coupling agent directly soluble in water or soluble in water with the aid of a co-solvent. The coupling agent can be used herein to refer to a silane with a functional group having the capability of chemically reacting with the surface of the silica to bond the silane to the silica. Each silane that is a coupling agent can have and additional functional group capable of compatibilizing with the natural or synthetic polymer into which the silica will be filled.

In one or more embodiments, the coupling agents can include a functional group having the capability of reaction with a rubbery or thermoplastic polymer during the cure or compounding thereof to chemically bind the coupling agent to the polymer. The coupling agent serves to promote a chemical bonding relationship between the silica surface and compatibilization of natural or synthetic polymers in the latex.

In the case of cross-linkable curable polymers, the coupling agents can serve to promote a chemical bonding relationship between both the silica surface and the cured polymer.

An expected advantage of the dual coupling agents with the nanomaterial is that the coupling agents will control hydrophobicity of the silica surface at reduced sulfur attachments to obtain improved rolling resistance, and improved scorch resistance.

In an embodiment, the silica from the compatibilized silica slurry is isolated and dried resulting in a partly hydrophobic silica, a compatibilized silica having coupling agents chemically bonded to its surface, which can be used in dry blending operations or reslurried for use as an aqueous suspension.

The silica is uniformly and quantitatively dispersed into the polymer once the latex has been coagulated.

The concepts of the embodiments can be applicable to a variety of natural and synthetic polymers including particularly rubber and thermoplastic polymers made in latex form.

Typical of the synthetic polymers useful in the embodiments can be those prepared by polymerizing or copolymerizing conjugated diene monomers such as butadiene, iso-prene, chloroprene, pentadiene, dimethylbutadiene and the like. It is also possible to apply the concepts of the process to other polymers made in latex form including, not only conjugated diene-based polymers, but also polymers based on vinyl monomers and combinations of conjugated dienes with vinyl monomers and mixtures thereof.

Suitable vinyl monomers can include but are not limited to: styrene, alpha-methylstyrene, alkyl substituted styrenes, vinyl toluene, divinylbenzene, acrylonitrile, vinyl chloride, methacrylonitrile, isobutylene, maleic anhydride, acrylic esters and acids, methylacrylic esters, vinyl ethers, vinyl pyridines and the like and mixtures thereof.

Specific polymers can be natural rubber, styrene-butadiene rubber or SBR, acrylonitrile-butadiene rubber or NBR, acrylonitrile-butadiene-styrene polymer or ABS, polybutadienes, polyvinylchloride or PVC, polystyrene, polyvinyl acetate, butadiene-vinyl pyridine polymers, polyisoprenes, polychloroprene, neoprene, styrene-acrylonitrile copolymer (SAN), blends of acrylonitrile-butadiene rubber with polyvinylchloride, and mixtures thereof.

In one or more embodiments, the process can be carried out with these polymers in their latex form and is particularly suited for application to natural rubber lattices.

"Emulsion polymerization," as the term is used herein can refer to the reaction mixture prior to the coagulation stage in an emulsion process. The process can be carried out with nanomaterial filled polymer lattices to which other fillers are added, such as carbon black, so that silica-carbon black masterbatches are attainable with uniform high loads of total filler and quantitative incorporation of the fillers.

A plurality of silane coupling agents from about 0.1 weight percent to about 25 weight percent can be blended together simultaneously and then can be added to the silica. The weight percent of the silanes is based on the total weight percent of the silica and silanes.

The plurality of silane coupling agents can be:
(i) a first silane that is an organosilicon derived from an organic silane having the structure: $Z_1Z_2Z_3Si(CH_2)_yX(CH_2)_ySIZ_1Z_2Z_3$, wherein X is a polysulfide, wherein y is an integer equal to or greater than 1; and wherein $Z_1$, $Z_2$, and $Z_3$ are each independently selected from the group consisting of hydrogen, alkoxy, halogen, and hydroxyl, and
(ii) a second silane that is an organosilane an organosilicon derived from an organic silane having the structure

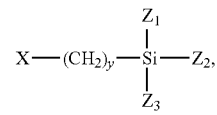

wherein:
(a) X is a functional group selected from the group consisting of: hydrogen, an amino group, a polyamino alkyl group, a mercapto group, a thiocyanato group, an epoxy group, a vinyl group, a halogen, an acryloxy group and a methacryloxy group;
(b) Y is an integer equal to or greater than 0; and
(c) $Z_1$, $Z_2$, and $Z_3$ are each independently selected from the group consisting of hydrogen, alkoxy, halogen, and hydroxyl; and
(iii) combinations thereof.

The plurality of silanes can be added to the silica forming a compatibilized silica. At least two silanes are added, which are different, connecting at different sites on the silica.

The compatibilized silica can be dry or wet blended with any natural or synthetic polymer.

In addition to the polymers already recited the compatibilized silica can be blended with polyolefins, and poly-alpha-olefins, polyesters, polyamides, polycarbonates, polyphenylene oxides, polyepoxides, polyacrylates, and copolymers of acrylates and vinyl monomers. Synthetic polyolefins include homopolymers, copolymers, and other comonomer combinations prepared from straight chain, branched, or cyclic-alpha-monoolefins, vinylidene olefins, and nonconjugated di- and triolefins, including 1,4-pentadienes, 1,4-hexadienes, 1,5-hexadienes, dicyclopentadienes, 1,5-cyclooctadienes, octatrienes, norbornadienes, alkylidene norbornenes, vinyl norbornenes, etc. Examples of such polymers include polyethylenes, polypropylenes, ethylene-propylene copolymers, ethylene-.alpha.-olefin-nonconjugated diene terpolymers (EPDMs), chlorinated polyethylenes, polybutylene, polybutenes, polynorbornenes, and poly-alpha-olefin resins and blends and mixtures thereof.

In one or more embodiments, a silica can first be treated with at least two coupling agents in an aqueous solution to form a compatibilized silica slurry.

As the silica employed, use can be made of a number of commercially available amorphous silica of either the precipitated or fumed type having finely divided particle sizes and high surface area.

The size of the silica particles can vary within relatively wide ranges, depending somewhat on the end use of the silica-filled or silica-reinforced polymer. In general, use can be made of silica having average particle sizes ranging from 1 nm to 120 nm and corresponding surface areas of 15-700 m.sup.2/g.

The finely divided silica is thus formed into an aqueous slurry and treated with a solution of coupling agents which chemically bind to different sites on the silica surface.

In general, such silicon compounds contain at least one, but no more than three, readily hydrolyzable groups bonded directly to the silicon atom. The hydrolyzable groups commonly employed in such coupling agents can be: halogens, hydrogen, hydroxyl, lower alkoxy groups such as methoxy, ethoxy, propoxy and like groups.

Also attached directly to the silicon atom are one to three organic groups compatible with the natural or synthetic polymer to which the silica is to be added, and the coupling agent can have at least one organic group containing a functional group capable of chemical reaction with the natural or synthetic polymer to which the silica is to be added. Such functional groups can include but are not limited to: amine groups, polyamino alkyl groups, mercapto groups, carbonyl groups, hydroxy groups, epoxy groups, halogens and ethylenically unsaturated groups.

The choice of functional group will be determined by the particular polymer and the particular method of fabrication of the polymer-silica masterbatch. For example, if this process is applied to a styrene-butadiene rubber to provide a silica masterbatch which will be cured via cross-linking reactions involving sulfur compounds, can utilize as the two coupling agents, organosilicon compounds wherein at least one organic group has mercapto, polysulfide, thiocyanato (—SCN), and a halogen and/or amino functionality. Correspondingly, if the silica filled polymer is to undergo a peroxy type of curing reaction, it can have as one of the two organosilicon compounds, at least one organic group with ethylenic unsaturation or epoxy groups.

Representative of coupling agents imparting compatibilization to the natural and synthetic polymers can be those from the groups consisting of: trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes wherein the alkyl group is a C.sub.1 to C.sub.18 linear, cyclic, or branched hydrocarbon or combinations thereof, and wherein for some particular embodiments one or two alkyl groups can be replaced with a phenyl or benzyl group or one to two alkyl groups can be replaced with a phenyl, benzyl, or alkoxy substituted alkyl group.

In one or more embodiments, one particular form of coupling agents employed can be those having the general structure: ##STR1## wherein X is a functional group selected from the group consisting of an amino group, polyamino alkyl group, a mercapto group, a polysulfide group, an epoxy group, a hydroxy group, a vinyl group, a halogen, an acryloxy group, a thiocyanato and a methacryloxy group; y is an integer equal to or greater than 0, such as within the range of 2 to 8; and, Z.sub.1, Z.sub.2 and Z.sub.3 are each independently selected from the group consisting of hydrogen, C.sub.1 to C.sub.18 alkyl, aryl such as phenyl, benzyl and the like, cycloalkyl such as cyclopentyl, cyclohexyl, etc., or aryl, alkoxy or halo substituted alkyls and C.sub.1 to C.sub.8 alkoxy groups, with the proviso that at least one of Z.sub.1, Z.sub.2 or Z.sub.3 must be one of the foregoing alkoxy groups or one of the Z's must be a halogen, hydroxyl, or hydrogen group. In an embodiment Z.sub.1, Z.sub.2, and Z.sub.3 all must be hydrolyzable; hydrolyzable groups include halogen, hydroxyl, alkoxy, or hydrogen.

A somewhat related group of coupling agents which can likewise be used can be bispolysulfides. These organosilicon compounds can be described as bis(trialkoxysilylalkyl) polysulfides containing 2 sulfur atoms to 8 sulfur atoms in which the alkyl groups are C.sub.1-C.sub.18 alkyl groups and the alkoxy groups are C.sub.1-C.sub.8 alkoxy groups.

Representative of such coupling agents which are commercially available can include: (gamma-aminopropyl)trimethoxysilane, (gamma-aminopropyl)triethoxysilane, (gamma-hydroxypropyl)tripropoxysilane, (gamma-mercaptopropyl)triethoxysilane, (gamma-aminopropyl)dimethylethoxysilane, (gamma-aminopropyl)dihydroxymethoxy-silane, (glycidylpropyl(trimethoxysilane, [(N-aminoethyl) gamma-aminopropyl]-triethoxysilane, (gamma-methacryloxy-propyl)triethoxysilane, (gamma-methacryoxy-propyl)trimethoxysilane, (beta-mercaptoethyl) triethoxysilane, [gamma-(N-aminoethyl)propyl] trimethoxysilane, N-methylaminopropyltrimethoxysilane, (gamma-thiocyanatopropyl)triethoxysilane, bis-(3-triethoxythiopropyl)tetrasulfide, vinyltriethoxysilane, vinylphenylmethylsilane, vinyldimethylmethoxysilane, divinyldimethoxysilane, divinylethyldimethoxysilane, dimethylvinylchlorosilane, and the like.

In carrying out the reaction between coupling agents, such as organosilanes, and the silica, the coupling agents can be dissolved in a lower alkanol such as propanol or ethanol at a pH below 9 to which water is slowly added, either continuously or incrementally, to commence hydrolysis of the hydrolyzable groups contained in the coupling agents to form the corresponding silanol. To assist in the hydrolysis of an alkoxy group, a pH in the range of 3.5-5.0 is desirable to minimize side reactions such as oligomerization of the organosilane, and can be maintained by use of dilute mineral acid such as hydrochloric or weak organic acids such as acetic acid. To assist in the hydrolysis of a hydride group more alkaline conditions can be needed and bases such as KOH, NaOH, NH.sub.4 OH, triethylamine, or pyridine can be employed to maintain a pH of 8-9. The choice of base will be dependent on the chemical nature of the specific latex to which the silica slurry is added.

The hydrolyzed coupling agent can be blended with an aqueous slurry of the finely divided silica whereby the silanol groups present in the coupling agent chemically react with the surface of the silica to form a siloxane bond (Si—O—Si) between the coupling agent and the silica surface. In an embodiment, the pH at this step is maintained at approximately 5.5-6.5 to favor reaction with the silica surface while allowing some condensation reaction between the silane molecules bonding to the surface of the silica. Depending on the particular silica and the initial pH of the water, this pH is attained without addition of further reagents.

The concentration of the silica in the slurry with which the hydrolyzed coupling agents is blended can be varied within relatively wide limits.

In general, use can be made of silica slurries containing about 1 percent to about 30 percent by weight silica based on the weight of the slurry. In one or more embodiments, the slurry concentration ranges from about 10 percent to about 20 percent by weight silica based on the weight of the slurry. Temperature and reaction time can be varied within wide limits. In general, temperatures ranging from ambient temperatures up to about 200 degrees Fahrenheit can be used. Similarly, the time for effecting the reaction between the hydrolyzed coupling agent and the silica can be varied within relatively wide limits, generally ranging from about 4 hours to about 48 hours, depending somewhat on the temperature employed.

The amount of the coupling agents employed can likewise be varied within relatively wide limits, depending in part on the amount of silica to be blended with the natural or synthetic polymer and the molecular weight of the coupling agent. Use can be made of coupling agents, wherein the total amount of the at least two coupling agents is within the range of about 1 part to about 25 parts of coupling agents per 100 parts by weight of silica.

The amount of coupling agents to be used can be defined in terms of the actual weight percent of organosilicon residing on the silica surface.

It has been found that to achieve greater than 90 percent by weight silica incorporation into a polymer, the weight percent of organosilicon on the surface of the silica must be in the range of at least 1.0-2.5, that is, a minimum of 1.0-2.5 grams of organosilicon from the silane is bound to 100 grams of silica charged to the slurry. For enhanced compatibility in dry mix or for additional chemical reaction with the natural or synthetic polymers, it can be desirable to bind greater than 14 percent by weight of organosilicon residue, as in moiety, per weight of silica.

After the silica has been treated with the coupling agents, the treated silica slurry can then be blended with the natural or synthetic polymer latex with sufficient agitation to uniformly distribute the treated silica throughout the latex.

The silica treated latex is stable and can be fed directly to a coagulation process, where coagulation aids conventional for that type of natural or synthetic polymer are employed.

The nanomaterial can be added to the latex once the silica is incorporated into the latex.

The nanomaterial can be carbon nanotubes, carbon nanorods, nanoribbons, paired nanoribbons and mixtures thereof. The nanomaterial can be single walled or multi-walled. The nanomaterial can be made from graphene. The nanomaterial can be polyaniline nanofibers. Regular polyaniline [PANI] is not a conductor of electricity. PANI conducts electricity only when doped. Doping is done with iodine or HCL.

The latex can include from about 2 weight percent to about 10 weight percent based on the final rubber formulation of additional additives, such as extender oils, colorants, antistatic additives, antioxidants, fillers and combinations thereof.

It is expected that the nanomaterial will form a density from 0.3 grams per cubic centimeter to 1.4 grams per cubic centimeter of resultant rubber formulation.

In one or more embodiments, an additional antistatic material, such as carbon black can be added with the nanomaterial into the latex.

Oil extenders can be from about 0.1 weight percent to about 50 weight percent based on the final rubber formulation of an aromatic extract oil, such as Sundex™ 8000 EU available from Holly refining and marketing of Tulsa, Okla.

Colorants can include inorganic powers such as Akrochem Brown Iron Oxides available from Akrochem Corp, which can be used in amounts from about 1 weight percent to about 10 weight percent based on the final rubber formulation. Additional colorants can include Akrochem 626 blue powder.

Pigments can be used such as an aqueous dispersion of material such as Octotine 120 ultramarine blue from Tiarco Chemical. Pigments can be used in amount from about 0.5 weight percent to about 62 weight percent based on the final rubber formulation. In one or more embodiments, the pigment can range from 55 weight percent to 62 weight percent.

Antistatic material can include carbon black, known as Sterling C (N293), available from Cabot Corporation, which can be used in amounts from about 5 weight percent to about 20 weight percent based on the final rubber formulation.

Other antioxidants can include phosphite, such as antioxidant TNPP-HP available from Akrochem Corp. Other antioxidants include hindered phenolic materials such as Irganox 1010, Irganox 76 (both from BASF), and Naugard 76 (Chemtura).

Fillers which can be added with the nanomaterials can include starch in amounts from about 0.1 weight percent to about 20 weight percent, or recycled rubber in amounts from about 0.1 weight percent to about 50 weight percent based on the final rubber formulation.

The stability of the latex will depend, however, on maintaining a proper pH range which is variable with the particular emulsion process. For example, when the emulsion process is a cold SBR process or cold NBR process utilizing anionic surfactants, the pH can be maintained at 8.0-9.5. However, if the process is a hot carboxylated SBR emulsion process or hot carboxylated NBR emulsion process using cationic surfactants, the pH can be kept between 3.5-5.5 to ensure stability of the latex.

The amount of the silica added to the latex can vary within wide ranges, depending in part on the coupling agents employed, the nature of the polymer, the use of other fillers such as carbon black, and the end use to which that polymer is subjected. In general, good results are obtained where the silica is added in an amount within the range of about 5 percent to about 80 percent by weight based upon the weight of the solids in the latex.

During coagulation, the compatibilized silica remains dispersed, intimately admixing and adhering to the polymer particles resulting in a substantially uniform distribution of the silica particles within the particles of the polymer. Other processing aids can be added to the polymer latex such as plasticizers, extender oils, and antioxidants along with the compatibilized silica slurry without modifying equipment and process conditions, or adversely affecting the dispersion of the silica during coagulation and dewatering.

The embodiments can provide a significant economic advantage in making rubber tires, in that, once the latex is coagulated to recover the polymer containing the compatibilized silica, the residual liquid phase contains only small amounts of the compatibilized silica which were not incorporated into the polymer.

The compatibilized silica, the partially hydrophobic silica, isolated from the compatibilized silica slurry by decantation and drying is characterized as having clusters of organosilicon oligomers on the surface of the silica. This clustering is the result of bonding to the silica surface oligomers of the organosilanes, that is, the organosilane undergoes some condensation reaction with itself to form an oligomeric structure which chemically binds to the silica surface via the Si—O—Si bonds.

The clusters of organosilane oligomers are identified by NMR as stated by M. Pursch, et. al. and as disclosed in Anal. Chem. 68, 386 and 4107, 1996. The spectrum was acquired with a 7 ms contact time, 5.0 kHz spinning speed, and a 33 kHz r.f. field on both $^{1}H$ and $^{29}Si$. The chemical shift scale is relative to the resonance for tetramethylsilane (TMS) at 0.0 ppm. The assignment of the resonances was made by comparison with previous spectral assignments of silanes bound to silica surfaces as described in Pursch. Two main groups of resonances are seen. The resonances of the silicon atoms on the surface of the silica are represented by the Q sites, $Q^2$, $Q^3$, and $Q^4$ at −93.7 ppm, −102.5 ppm, and −112.0 ppm, respectively. The T sites, $T^2$ and $T^3$, at −57.5 and −67.9 ppm respectively, correspond to silicon atoms of the silanes that are chemically bonded to the silica surface.

The different T-sites are characterized as to the degree of oligomerization or cross-linking of the silanes on adjacent silicon atoms with each other. That is, a $T^1$ site represents a silane molecule chemically bonded only to the silica surface. A $T^2$ site represents a silane molecule chemically bonded to a Si atom on the silica surface and to one adjacent silane or a silane chemically bonded to two adjacent surface Si atoms, i.e. partially cross-linked structures; while a $T^3$ site represents a silane molecule chemically bonded to a Si atom in the silica surface and to two adjacent silanes or a silane chemically bonded to three surface Si atoms, i.e. completely cross-linked structure. Pursch et. al. have used the relationship of the intensity of the T-sites to define an extent of oligomerization or cross-linking parameter referred to as parameter Q, and is defined below:

The compatibilized silica of this embodiment has a parameter Q value of greater than 80 percent while prior art and commercial silane treated silicas measure a Q value of less than 75 percent. The higher Q value for the compatibilized silica of this embodiment is due to the greater proportion of $T^3$ sites, that is, a higher concentration of oligomerized or fully cross-linked silane is present. The compatibilized silica of this embodiment can be described as having a $T^3/T^2$ ratio of 0.75 or greater. Commercial silane coated silica and silica described in prior art publications have $T^3/T^2$ ratios of 0.6 or less. The higher degree of cross-linking in the silica of this embodiment can be explained as having an average tetrameric structure of silane on the surface in contrast to commercial silica where the average structure ranges from monomeric to trimeric.

While not wishing to be bound by any theory, it is believed that the average tetrameric structure of the silane bound to the silica surface of the compatibilized silica may be due to the aqueous reaction medium used in its preparation. By controlling the pH of the aqueous phases, hydrolysis and oligomerization reactions may compete with adsorption and chemical reaction of the silanol groups on the silica surface. Thus more organosilane may bind to the surface in oligomeric form.

It will be understood that various changes and modifications can be made in the details of formulation, procedure and use. The following examples are provided by way of illustration and not by way of limitation of the practice of the present embodiments.

Chemicals used to demonstrate the concepts of these embodiments can be as follows:

Silquest™ A-189 (Momentive) is (gamma-mercapto)propyltrimethoxysilane.

Hi-Sil™ 233 (PPG) is a precipitated, hydrated amorphous silica in powder form, ultimate particle size of 0.019 microns.

Octyltrimethoxy silane is a Dow Corning™ product Z-6341 with a CAS number 2943-75-1 and a linear formula $CH_3(CH_2)_7Si(OC_2H_5)_3$ and a molecular weight of 276.49.

Trimethoxy silane is also available from Dow Corning with a CAS number of 2487-90-3 and a molecular formula of $C_3H_{10}O_3Si$.

Dodecylmethyldiethoxy silane is available from American Custom Chemicals Corporation of San Diego with a CAS number 60317-40-0 and a linear formula $C_{17}H_{38}O_2Si$ and a molecular weight of 302.57.

Disiloxane, hexamethoxy also known as Hexamethoxy silane has a Molecular Formula: $C_6H_{18}O_7Si_2$ Molecular Weight: 258.37.

Nanomaterial as the term is used herein can include carbon nanofibers, such as vapor grown carbon fibers (VGCFs), or vapor grown carbon nanofibers (VGCNFs) which are cylindric nanostructures with graphene layers arranged as stacked cones, cups or plates. Carbon nanofibers with graphene layers wrapped into perfect cylinders are called carbon nanotubes. The nanomaterial can be paired nanoribbons that boost conductivity, reducing static charge of the polymer.

It can be noted that nanomaterial can be added to any of the latex after the silica is added to enhance structural characteristics of the resultant rubber such as wear, which improves by about 15 percent, and stiffness.

EXAMPLE 1

Preparation of an SBR-Silica-Carbon Black Masterbatch

A. Preparation of Compatibilized Silica Slurry

An aqueous solution of silane was prepared by charging to a vessel 25.1 g Silquest™ A-189 (Momentive), with 30 grams of octyltrimethoxy silane from Gelest and 27 g isopropanol, 1.1 g of glacial acetic acid and 27 g water. The initially cloudy mixture was agitated at high speed and room temperature until clear, about 10-20 minutes, after which an additional 28 g of water were added which made the mixture cloudy. Agitation was continued for about 15-20 minutes until the solution cleared.

To a separate vessel equipped with a stirrer 16 lb of water and 4.05 lb of fine-particle, dry silica, Hi-Sil™ 233 were charged and agitated for about 15 minutes to wet and disperse the silica. The aqueous solution of silane was then added with continued agitation, the pH was increased to 7.5-8.0 with 25 percent sodium hydroxide and the blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batchwise to a concentrated polymer latex such as with 23 weight percent solids.

B. Blend Compatibilized Silica Slurry with SBR Latex

Slurry as prepared in Step A above was charged to an agitated vessel containing a mixture of 41.1 lb of SBR latex containing 21.9 weight percent 1502-type rubber and 0.3 lb of antioxidant emulsion containing 13.4 weight percent Santoflex™ 134 held at 140 degrees Fahrenheit. To this initial mixture was also charged 21.8 lb of hot carbon black slurry containing 6.2 weight percent N234-type carbon black and 2.74 lb of hot oil emulsion containing 65.6 weight percent Sundex™ 8125.

To this mixture, 0.1 lb of carbon single walled nanotubes available from Cheaptubes.com known as product SKU-0111 can be added filling in and linking into the matrix.

The final mixture was agitated for 30 minutes at 140 degrees Fahrenheit.

The above latex blend was slowly added to a larger, agitated vessel which initially contained 40-45 lb of water and sufficient sulfuric acid to give a pH of 4. The rates of addition of latex blend and sulfuric acid were varied to maintain the pH of the resulting coagulation serum in the range of 4-5 over the 30-40 minutes that the latex blend was added. An additional 30-40 minutes of mix time and additional acid were used as needed to allow product particle size to grow and to clear the serum of free latex as is commonly done by those familiar with the art. The wet masterbatch particle or crumb size achieved by this coagulation was similar to that obtained from coagulations without silica. Visual inspection and chemical analysis of the dried masterbatch showed that essentially all solid and liquid components added to the latex mixture were absorbed and uniformly distributed. Silica absorption was 97-98 percent of charge as estimated by ash analysis.

EXAMPLE 2

Preparation of an SBR-Silica-Nanomaterial Masterbatch

A. Preparation of Compatibilized Silica Slurry

An aqueous solution of silane was prepared by charging to a vessel, 50.2 grams Silquest™ A-189 plus 60 grams of octyltrimethoxy silane, 55 g isopropanol, 2.2 g of glacial acetic acid and 55 g water. The initially cloudy mixture was agitated at high speed and room temperature until clear, about 10-20 minutes, after which an additional 55 g of water were added which made the mixture cloudy. Agitation was continued for about 15-20 minutes until the solution cleared.

To a separate vessel equipped with a stirrer 16 lb of water and 4.05 lb of fine-particle, dry silica, Hi-Sil™ 233 were charged and agitated for about 15 minutes to wet and disperse the silica. The aqueous solution of silane was then added with continued agitation, the pH was increased to 7.5-8.0 with 25 percent sodium hydroxide and the blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batchwise to a concentrated polymer latex.

B. Blend Compatibilized Silica Slurry with SBR Latex

Slurry as prepared in Step 2A above was charged to an agitated vessel containing a latex mixture with nanomaterials as described in Example 1.

The final masterbatch mixture was agitated for 30 minutes at 140 degrees Fahrenheit.

The above latex blend was coagulated as in Example 1. The wet masterbatch particle or crumb size achieved by this coagulation was similar to or slightly larger than that obtained from coagulations without silica. Visual inspection and chemical analysis of the dried masterbatch showed that essentially all solid and liquid components added to the latex mixture were absorbed and uniformly distributed. Silica absorption was about 99 percent of charge as estimated by ash analysis.

EXAMPLE 3

Preparation of an NBR-Silica Masterbatch

A. Preparation of Compatibilized Silica Slurry

An aqueous solution of two silanes was prepared by charging to a vessel, 12 grams of Silquest™ A-189, and 13.4 grams of hexamethoxy silane, 13 grams isopropanol, 0.5 grams of glacial acetic acid and 13 grams water. The initially cloudy mixture was agitated at high speed and room temperature until clear, about 10-20 minutes, after which an additional 13 g of water were added which made the mixture cloudy. Agitation was continued for about 15-20 minutes until the solution cleared.

To a separate vessel equipped with a stirrer 6.4 lb of water and 1.4 lb of fine-particle, dry silica, Hi-Sil™ 233 were charged and agitated for about 15 minutes to wet and disperse the silica. The aqueous solution of silane was then added with continued agitation, the pH was increased to 7.5-8.0 with 25 percent sodium hydroxide and the blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batchwise to a concentrated polymer latex such as with 23 weight percent solids.

B. Blend Compatibilized Silica Slurry with NBR Latex

Slurry as prepared in Step A above was charged to an agitated vessel containing a mixture of 29.2 lb of NBR latex containing 24.0 weight percent Nycryl™ made by Lion Copolymer of Baton Rouge, La., 40-5 rubber and 216 grams of antioxidant emulsion containing 14.7 weight percent Agerite Geltro™. (Vanderbilt Chemical) held at 140 degrees Fahrenheit. To this initial mixture was also charged 34.4 lb of hot carbon black slurry containing 6.1 weight percent N234-type carbon black. The final mixture was agitated for 30 minutes at 140 degrees Fahrenheit.

To this initial mixture is added 0.2 lb of graphite nanoribbons containing 100 percent graphene available from Cheaptubes.com and identified as product HDPLAS™ GNP grade 3, industrial grade nanoribbon. Graphene, as the term is used herein, refers to an allotrope of carbon. It has a structure of one-atom-thick planar sheets of $sp^2$-bonded carbon atoms that are densely packed into a honeycomb crystal lattice. The term graphene was coined as a combination of graphite and the suffix -ene.

The above latex blend was slowly added to a larger vessel which initially contained 25 lb of water and sufficient sulfuric acid to give a pH of 4. The coagulation was completed as in previous examples. The wet masterbatch crumb size achieved by this coagulation was similar to that obtained from NBR coagulations without silica. Visual inspection and chemical analysis of the dried masterbatch showed that essentially all solid and liquid components added to the latex mixture were absorbed and uniformly distributed. Silica absorption was 97-98 percent of charge as estimated by ash analysis.

EXAMPLE 4

Preparation of a Natural Rubber-Silica Masterbatch Blend Compatibilized Silica Slurry with NR Latex Compatibilized silica slurry as prepared in Step A of Example 3 above was charged at 3.33 pounds to an agitated vessel containing a mixture of 5.17 lb of latex containing 58.0 weight percent natural rubber and 93 grams of antioxidant emulsion containing 14.7 weight percent Agerite Geltrol. (Vanderbilt Chemical).

Added to this blend of latex is 0.5 pounds of a single walled carbon nanotube.

This mixture was agitated for 30 minutes at 140 degrees Fahrenheit.

The above latex blend was slowly added to a larger vessel which initially contained 8 lb of water and sufficient sulfuric acid to give a pH of 4. The coagulation was completed as in previous examples. The wet masterbatch crumb size achieved by this coagulation was similar to that obtained from SBR and NR coagulations without silica. Visual inspection and chemical analysis of the dried masterbatch showed that essentially all the silica added to the latex mixture was absorbed and uniformly distributed. Silica absorption was 98-99 percent of charge as estimated by ash analysis.

EXAMPLE 5

Preparation of an
SBR-Silica-Nanomaterial-Masterbatch

A. Preparation of Compatibilized Silica Slurry

An aqueous solution of silane was prepared by charging to a vessel 40.1 g Silquest. A-189 (Momentive) with 10 grams dodecylmethyldiethoxy silane, 27 g isopropanol, 1.1 g of glacial acetic acid and 27 g water. The initially cloudy mixture was agitated at high speed and room temperature until clear, about 10-20 minutes, after which an additional 28 g of water were added which made the mixture cloudy. Agitation was continued for about 15-20 minutes until the solution nearly cleared. The pH of the solution was 3.5.

To a separate vessel equipped with a stirrer 16 lb of water and 4.05 lb of fine-particle, dry silica, Hi-Sil™ 233 were charged and agitated for about 15 minutes to wet and disperse the silica. The aqueous solution of silane was then added with continued agitation, the pH was measured to be 6.0-6.5. The blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batchwise to a concentrated polymer latex.

B. Blend Compatibilized Silica Slurry with SBR Latex

A Slurry was prepared in Step A above and charged to an agitated vessel containing a mixture of 41.1 lb of SBR latex containing 21.9 weight percent 1502-type rubber and 0.3 lb of antioxidant emulsion containing 13.4 weight percent Santoflex 134 and then held at 140 degrees Fahrenheit.

0.2 lb of graphene nanoribbons was added to the latex mixture.

Next, 2.74 lb of hot oil emulsion containing 65.6 weight percent Sundex® 8125 as added to the latex.

The final mixture was agitated for 30 minutes at 140 degrees Fahrenheit.

The above latex blend was slowly added to a larger, agitated vessel which initially contained 40-45 lb of water and sufficient sulfuric acid to give a pH of 4. The rates of addition of latex blend and sulfuric acid were varied to maintain the pH of the resulting coagulation serum in the range of 4-5 over the 30-40 minutes that the latex blend was added. An additional 30-40 minutes of mix time and additional acid were used as needed to allow product particle size to grow and to clear the serum of free latex as is commonly done by those familiar with the art. The wet masterbatch particle or crumb size achieved by this coagulation was similar to that obtained from coagulations without silica. Visual inspection and chemical analysis of the dried masterbatch showed that essentially all solid and liquid components added to the latex mixture were absorbed and uniformly distributed. Silica absorption was 98 percent of charge as estimated by ash analysis.

In one or more embodiments, the polymer silica masterbatch can include a natural rubber latex or a synthetic rubber latex or a thermoplastic polymer or a resin polymer, or combinations thereof.

The natural rubber latex can be Guayule available from Yulex.

EXAMPLE 6

Isolation of the Compatibilized Silica from the Aqueous Suspension

Silica slurry as prepared in Example 5 was separated from the excess water by decantation. The wet silica was placed in an open dish and heated in an oven at about 170 degrees Fahrenheit overnight. The silica after drying was in chunk form and was crushed to a powder. The powdered silica was dried an additional 15-30 minutes at 300 degrees Fahrenheit.

While these embodiments have been described with emphasis on the embodiments, it should be understood that within the scope of the appended claims, the embodiments might be practiced other than as specifically described herein.

What is claimed is:

1. A polymer silica masterbatch comprising:
   a. a latex of a natural or a synthetic polymer;
   b. 0.1 weight percent to 10 weight percent of a nanomaterial comprising a nanotube, a nanorod, a nanoribbon and mixtures thereof to form a density from 0.3 grams per cubic centimeter to 1.4 grams per cubic centimeter of a final material; and
   c. 5 weight percent to 80 weight percent of a compatibilized silica with 0.1 weight percent to 25 weight percent of a plurality of silane coupling agents chemically bound to its surface wherein the silanes are present as an average tetrameric structure having a T.sup.3/T.sup.2 ratio of 0.75 or greater as measured by NMR and wherein the plurality of silane coupling agents comprises:
      (i) a first silane comprising an organosilicon having a structure: $Z_1Z_2Z_3Si(CH_2)_yX(CH_2)_ySiZ_1Z_2Z_3$, wherein X is a polysulfide, wherein y is an integer equal to or greater than 1; and wherein $Z_1$, $Z_2$, and $Z_3$ are each independently selected from the group consisting of hydrogen, alkoxy, halogen, and hydroxyl; and
      (ii) a second silane comprising an organosilicon having a structure

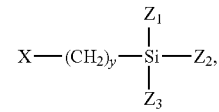

wherein:
1. X is a functional group selected from the group consisting of: hydrogen, an amino group, a polyamino alkyl group, a mercapto group, a thiocyanato group, an epoxy group, a vinyl group, a halogen, an acryloxy group and a methacryloxy group;

2. Y is an integer equal to or greater than 0; and

3. $Z_1$, $Z_2$, and $Z_3$ are each independently selected from the group consisting of: hydrogen, alkoxy, halogen, and hydroxyl.

2. The polymer silica masterbatch of claim 1, wherein the compatibilized silica has a $T^3/T^2$ ratio of 0.9 or greater.

3. The polymer silica masterbatch of claim 1, wherein the compatibilized silica has a total weight from 2 weight percent to 18 weight percent of at least two different organosilicons bound to its surface based on the total weight of the silica.

4. The polymer silica masterbatch of claim 1, wherein at least two organosilicons bonding to the silica surface are derived from organosilicons having three readily hydrolyzable groups attached directly to a silicon atom of the organosilicon, and further wherein each organosilicon has at least one organic group attached directly to its silicon atom.

5. The polymer silica masterbatch of claim 4, wherein the organic groups attached directly to the silicon atom each contain at least one functional group.

6. The polymer silica masterbatch of claim 1, wherein the natural or synthetic polymer is a natural rubber latex or a synthetic rubber latex or a thermoplastic polymer or a resin polymer, or combinations thereof.

7. The polymer silica masterbatch of claim 6, wherein the natural rubber is Guayule.

8. The polymer silica masterbatch of claim 6, wherein the natural or synthetic polymer is a polymer selected from the group consisting of: a polymer of a conjugated diene, a vinyl monomer and combinations thereof.

9. The polymer silica masterbatch of claim 6, wherein the synthetic polymer is from the group consisting of: styrene-butadiene rubber, acrylonitrile-butadiene rubber, polyvinylchloride, acrylonitrile-butadiene-styrene polymer, carboxylated styrene butadiene, carboxylated acrylonitrile-butadiene, styrene-acrylonitrile copolymer, polybutadiene, polyisoprene, polychloroprene, neoprene, polybutadiene-isoprene, or mixtures thereof.

10. The polymer silica masterbatch of claim 1, further comprising from 2 weight percent to 10 weight percent based on the final rubber formulation of a member of the group comprising: extender oils, colorants, pigments, antistatic additives, antioxidants, stabilizers, other fillers and combinations thereof.

11. The polymer silica masterbatch of claim 1, wherein the nanomaterial is a single wall carbon nanotube, a graphene, a graphene nanoribbon, a paired nanoribbon or combinations thereof.

\* \* \* \* \*